US009555831B1

(12) United States Patent
Dahlstrom

(10) Patent No.: US 9,555,831 B1
(45) Date of Patent: Jan. 31, 2017

(54) TRACTOR-TRAILER WITH CONVERTIBLE STEERING ARRANGEMENT

(71) Applicant: Gale Dahlstrom, Hoquiam, WA (US)

(72) Inventor: Gale Dahlstrom, Hoquiam, WA (US)

( * ) Notice: Subject to any disclaimer, the term of this patent is extended or adjusted under 35 U.S.C. 154(b) by 0 days.

(21) Appl. No.: 14/205,017

(22) Filed: Mar. 11, 2014

Related U.S. Application Data

(60) Provisional application No. 61/785,447, filed on Mar. 14, 2013.

(51) Int. Cl.
*B62D 13/02* (2006.01)
*B62D 53/06* (2006.01)
*B60D 1/54* (2006.01)

(52) U.S. Cl.
CPC ............... *B62D 13/025* (2013.01); *B60D 1/54* (2013.01); *B62D 53/06* (2013.01)

(58) Field of Classification Search
CPC ..... B62D 13/025; B62D 13/005; B62D 13/02; B62D 13/06; B62D 12/00; B62D 12/02; B62D 53/06; B60D 1/54; A01B 59/042
See application file for complete search history.

(56) References Cited

U.S. PATENT DOCUMENTS

| | | | | |
|---|---|---|---|---|
| 1,764,971 A | * | 6/1930 | Nilson | 280/402 |
| 2,223,781 A | * | 12/1940 | Carmody | 280/426 |
| 2,520,776 A | * | 8/1950 | Page | B62D 13/02 |
| | | | | 280/140 |
| 2,794,655 A | * | 6/1957 | Charette | 280/426 |
| 3,556,559 A | * | 1/1971 | Interisano | 280/407 |
| 3,663,039 A | * | 5/1972 | Morgan | 280/408 |
| 3,972,540 A | * | 8/1976 | Donaldson | 280/404 |
| 3,993,326 A | * | 11/1976 | Schmidt | 280/426 |
| 4,017,094 A | * | 4/1977 | Pilcher | B60P 3/40 |
| | | | | 280/404 |
| 4,226,436 A | * | 10/1980 | Donaldson | B60P 3/41 |
| | | | | 280/404 |
| 4,383,698 A | * | 5/1983 | Felburn | 280/426 |
| 4,484,758 A | * | 11/1984 | Murray | 280/442 |
| 4,561,671 A | * | 12/1985 | DeWitt | B60P 1/6481 |
| | | | | 280/142 |
| 4,566,714 A | * | 1/1986 | De Witt | B60P 1/6481 |
| | | | | 280/142 |
| 4,660,848 A | * | 4/1987 | DeWitt | 280/404 |

(Continued)

FOREIGN PATENT DOCUMENTS

| | | | | | |
|---|---|---|---|---|---|
| CH | 166631 | * | 1/1934 | | B62D 13/02 |
| DE | 2261159 | * | 6/1973 | | B60P 3/42 |

(Continued)

*Primary Examiner* — Joseph Rocca
*Assistant Examiner* — Maurice Williams
(74) *Attorney, Agent, or Firm* — Seed IP Law Group LLP

(57) ABSTRACT

A tractor-trailer for hauling a load is provided which is convertible from a conventional steering arrangement to a stinger steering arrangement to maneuver relatively long loads around tighter corners, roundabouts and other obstacles. The tractor-trailer includes a rear wheel assembly with a telescoping reach and a towing tractor including a chassis and a stinger to selectively attach to the telescoping reach of the rear wheel assembly. The stinger is movably coupled to the chassis to move between a stowed configuration for conventional steering and a deployed configuration for stinger steering.

18 Claims, 2 Drawing Sheets

(56) References Cited

U.S. PATENT DOCUMENTS

| | | | | |
|---|---|---|---|---|
| 4,768,801 A * | 9/1988 | DeWitt | ................ | 280/404 |
| 4,955,777 A * | 9/1990 | Ineson | ................ | B64F 1/22 |
| | | | | 180/904 |
| 4,966,383 A * | 10/1990 | Sjostrom | ................ | 280/404 |
| 5,236,214 A * | 8/1993 | Taylor | ................ | B60D 1/155 |
| | | | | 280/402 |
| 5,305,844 A * | 4/1994 | Ducote | ................ | 180/24.01 |
| 6,592,139 B1 * | 7/2003 | Shanahan | ................ | 280/414.5 |
| 6,663,132 B1 * | 12/2003 | Kizy | ................ | B60D 1/26 |
| | | | | 280/479.1 |
| 7,677,588 B2 * | 3/2010 | Coers et al. | ................ | 280/478.1 |
| 7,784,812 B1 * | 8/2010 | Lares | ................ | 280/474 |
| 7,976,051 B1 * | 7/2011 | Laster et al. | ................ | 280/477 |
| 8,262,118 B2 * | 9/2012 | Pipe | ................ | B62D 21/14 |
| | | | | 280/407 |
| 8,408,576 B2 * | 4/2013 | Volk | ................ | 280/293 |
| 2012/0080866 A1 * | 4/2012 | West | ................ | 280/476.1 |

FOREIGN PATENT DOCUMENTS

| | | | | |
|---|---|---|---|---|
| DE | 3235546 A1 * | 3/1984 | ............ | B60D 1/14 |
| EP | 0034032 A2 | 8/1981 | | |
| EP | 290363 * | 11/1988 | ............ | B50D 1/40 |
| EP | 799730 * | 10/1997 | ............ | B60D 1/145 |
| EP | 869050 * | 10/1998 | ............ | B62D 53/06 |
| EP | 1291604 A2 * | 3/2003 | ............ | F41H 7/02 |
| EP | 2778015 A1 * | 9/2014 | | |
| FR | 547810 * | 12/1922 | ............ | B62D 13/025 |
| WO | WO 9013446 * | 1/1990 | ............ | B60G 5/04 |

\* cited by examiner

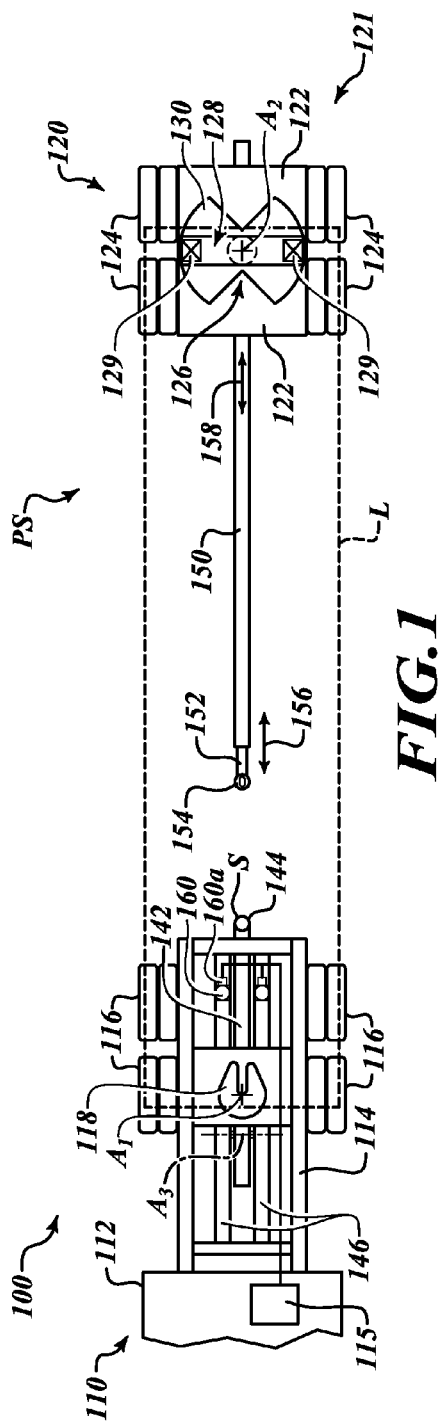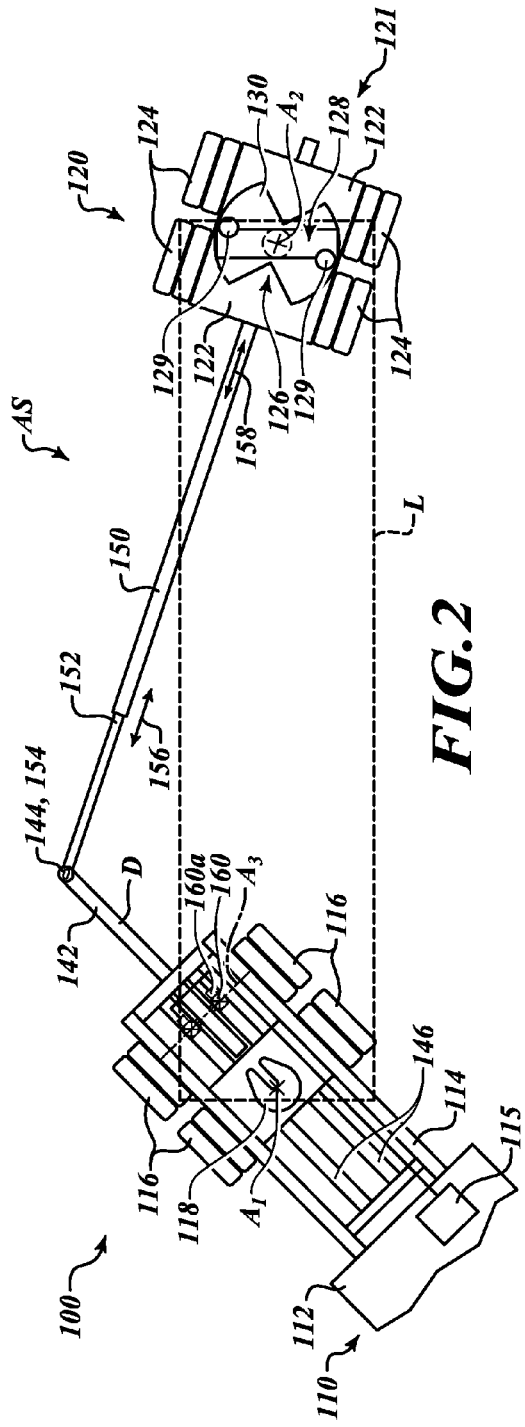

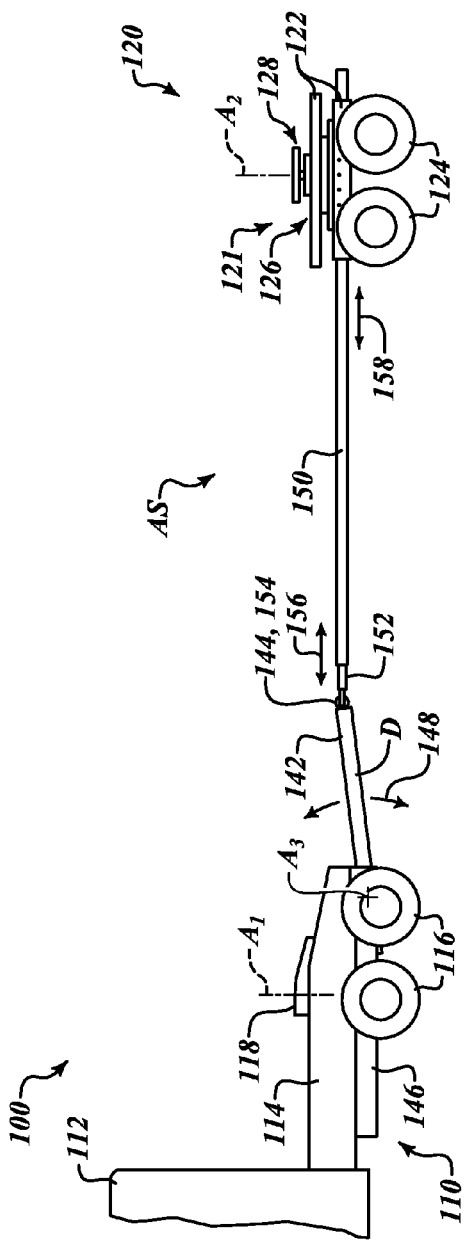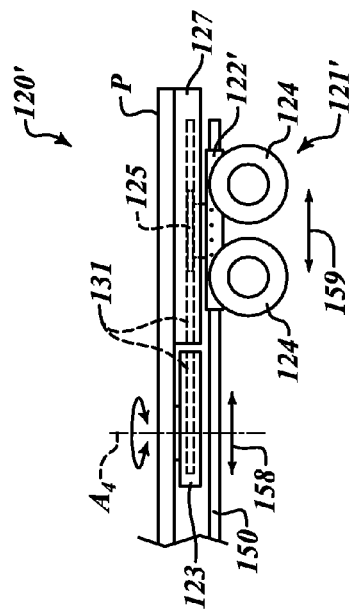

TRACTOR-TRAILER WITH CONVERTIBLE STEERING ARRANGEMENT

BACKGROUND

Technical Field

This disclosure generally relates to tractor-trailers and more particularly to tractor-trailers and towing tractors thereof that are convertible from a conventional steering arrangement to a stinger steering arrangement.

Description of the Related Art

Long haul tractor-trailers are known which feature conventional steering arrangements wherein the rear wheels of the trailer are aligned parallel to the hauled load. In this manner, the rear wheels may be considered passive. As a result, it is often difficult for such vehicles, particularly those having trailers of the 53 foot variety, to maneuver around tighter corners, roundabouts and other obstacles because the rear wheels do not track with the front wheels and tend to cut corners. As such, various tractor-trailer combinations may be provided with active steering of the rear wheels to assist in negotiating corners, roundabouts and other obstacles. In this context, active steering may refer to steering arrangements in which the rear wheels may be rotated relative to the hauled load to assist in steering activities. Some examples of tractor-trailers with active steering arrangements may be found in U.S. Pat. Nos. 3,972,540, 3,993,326, and 4,660,848 and European Patent No. 0034032, which are incorporated herein by reference in their entirety. Various known tractor-trailers having active steering functionality, however, may suffer from a variety of drawbacks or deficiencies. For example, the tractor-trailers may be overly complex or may require custom tractor units that may not be well suited to tow common trailer configurations, thereby diminishing the versatility of such tractors.

BRIEF SUMMARY

Embodiments described herein provide tractor-trailers and towing tractors thereof that are particularly versatile and enable conversion between passive and active rear wheel steering configurations. More particularly, the tractor-trailers are convertible between a passive steering configuration and a stinger steering configuration. Advantageously, the tractor-trailer may be converted to a stinger steering configuration or arrangement when hauling loads in-city and converted to a conventional passive steering configuration or arrangement when hauling loads cross-country, for example.

In one embodiment, a tractor-trailer for hauling a load may be summarized as including a rear wheel assembly having a telescoping reach and a towing tractor including a chassis and a stinger movably coupled to the chassis to selectively attach to the telescoping reach of the rear wheel assembly. The stinger may be movably coupled to the chassis to move between a stowed configuration for passive steering and a deployed configuration for stinger steering.

The stinger of the towing tractor may be configured to pitch up and down when the stinger is in the deployed configuration and attached to the telescoping reach of the rear wheel assembly. Moreover, when the stinger is in the deployed configuration, it may be selectively locked to restrain movement fore and aft and side-to-side. For this purpose, the towing tractor may include a lock to selectively lock the stinger in the deployed configuration. For example, a lock may be provided which includes an inflatable member that is activated with a pressurized air system of the towing tractor. The chassis of the towing tractor may further include a rail system and the stinger may be slidably coupled to the rail system to move between the stowed configuration and the deployed configuration. When the stinger is in the deployed configuration and in an unlocked configuration, a coupling end of the stinger may be movable side-to-side to assist in aligning the stinger with the telescoping reach of the rear wheel assembly. After the stinger is aligned and connected to the telescoping reach, the stinger may be locked to limit movement thereof. For example, the stinger may be locked from moving fore and aft or from yawing side-to-side, while nevertheless being able to pitch up and down as described earlier.

The rear wheel assembly of the tractor-trailer may include a rear chassis and a bolster. The bolster may have a locked configuration in which the bolster is fixedly secured to the rear chassis and an unlocked configuration in which the bolster is rotatably coupled to the rear chassis. In this manner, the bolster can be selectively locked and unlocked to allow the load carried thereby to rotate relative to the rear chassis during steering activities.

The tractor-trailer may further comprise a trailer assembly including a coupling pin to attach to the towing tractor, and the towing tractor may include a conventional fifth wheel to receive the coupling pin of the trailer assembly. In this manner, the towing tractor of the tractor-trailers described herein may couple to various conventional trailer arrangements despite their convertible nature. In some instances, the rear wheel assembly may include a rear chassis that is slidably coupled to a container, bed or platform of the trailer assembly to move between a locked configuration, in which an orientation of the rear chassis is fixed relative to the load, and an unlocked configuration, in which the rear chassis is rotatable relative to the load to assist in steering. In this manner, the rear chassis may be repositioned beneath the container, bed or platform of the trailer assembly to activate the stinger steering configuration. In some cases, the telescoping reach may be slidably coupled to the rear wheel assembly to selectively adjust a position of the reach. Other well-known structures and devices associated with tractor trailers and steering systems, such as, for example, landing gear and other tractor-trailer structures, may be provided, but are not shown or described in detail to avoid unnecessarily obscuring descriptions of the embodiments.

BRIEF DESCRIPTION OF THE SEVERAL VIEWS OF THE DRAWINGS

FIG. 1 is a top plan view of a tractor-trailer, according to one embodiment, in a passive steering arrangement.

FIG. 2 is a top plan view of the tractor-trailer of FIG. 1 in an active, stinger steering arrangement, and in which the tractor-trailer is shown turning.

FIG. 3 is a side elevational view of the tractor-trailer of FIGS. 1 and 2 in the active, stinger steering arrangement, and in which the tractor-trailer is shown in a straight-ahead position.

FIG. 4 is a side elevational view of a rear portion of a tractor-trailer combination, according to another embodiment, in a passive steering arrangement.

DETAILED DESCRIPTION

In the following description, certain specific details are set forth in order to provide a thorough understanding of various disclosed embodiments. However, one of ordinary skill in the relevant art will recognize that embodiments may be practiced without one or more of these specific details. In other instances, well-known structures and devices associated with tractor-trailers and steering systems may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein provide tractor-trailers and towing tractors thereof that are particularly versatile and enable conversion between passive and active rear wheel steering configurations. More particularly, the tractor-trailers are convertible between a passive steering configuration and a stinger steering configuration. Advantageously, the tractor-trailer may be converted to a stinger steering configuration or arrangement when hauling loads in-city and converted to a conventional passive steering configuration or arrangement when hauling loads cross-country, for example. In addition, it is appreciated that many existing towing tractors may be modified or retrofitted with a deployable stinger assembly to provide functionalities described herein. Accordingly, some embodiments may be directed to retrofit kits and the like for towing tractors as well as towing tractors fitted with a deployable stinger.

FIGS. 1 through 3 illustrate one example embodiment of a tractor-trailer 100 that is particularly versatile and may be converted between a passive steering configuration or arrangement PS, as shown in FIG. 1, and an active stinger steering configuration or arrangement AS, as shown in FIGS. 2 and 3. The tractor-trailer includes a towing tractor 110 and a trailer assembly 120 that is coupleable to the towing tractor 110 to be pulled or hauled thereby.

The towing tractor 110 includes a cab 112 and a structural frame or chassis 114. The frame or chassis 114 is coupled to a plurality of front wheels 116 by one or more axles. The towing tractor 110 further includes a fifth wheel 118 for coupling to a coupling pin (not shown) of the trailer assembly 120, thereby enabling the trailer assembly 120 or a portion thereof (e.g., front end of a container, trailer bed or platform) to rotate about a pivot axis $A_1$. Advantageously, it will be appreciated by those of ordinary skill in the relevant art that the fifth wheel 118 may be positioned and configured to accept various industry standard trailer configurations. In this regard, the towing tractors 110 described herein may be used in conventional hauling operations without regard to the convertible stinger steering functionality of such towing tractors 110.

The trailer assembly 120 may include a rear wheel assembly 121, which may be, for example, in the form of a dolly or other wheeled assembly. The rear wheel assembly 121 includes a rear frame or chassis 122 that is coupled to one or more rear wheels 124 by one or more axles. The rear wheel assembly 121 may further include a bolster 128 coupled to the rear frame or chassis 122 at a pivot location 126. The bolster 128 may be configured to receive a load L, such as the aft end of a container or trailer bed or platform and to support the same during operation. The bolster 128 may be configured to include a locked configuration in which the bolster 128 is fixedly secured to the rear frame or chassis 122 and an unlocked configuration in which the bolster 128 is rotatably coupled to the rear chassis 122 about a pivot axis $A_2$. One or more bolster locks 129 may be provided for this purpose. Locking devices, including locking devices associated with tractor-trailers and steering systems thereof, are well-known and are not shown or described in further detail to avoid unnecessarily obscuring descriptions of the embodiments.

With reference to FIG. 1, the bolster 128 may be locked such that it is fixedly secured to the rear frame of chassis 122 when the tractor-trailer 100 is in the passive steering PS configuration. In this locked state, the bolster 128 is unable to rotate about the pivot axis $A_2$ through the illustrated range of motion 130. As a result, the rear frame or chassis 122 and rear wheels 124 are maintained parallel to the hauled load L when the bolster 128 is locked. Conversely, with reference to FIG. 2, the bolster 128 may be unlocked such that it is free to rotate relative to the rear frame of chassis 122 about the central axis $A_2$ when the tractor-trailer 100 is in the active steering AS configuration. In this unlocked state, the bolster 128 may rotate through the illustrated range of motion 130. As a result, the rear frame or chassis 122 and rear wheels 124 may rotate relative to the hauled load L and more closely track the path of the front wheels 116 during turning activities.

With reference to FIGS. 2 through 3, the rear wheel assembly 121 may further include a telescoping reach 150 in which a compensator portion 152 is extendable to allow a coupling end 154 of the telescoping reach 150 to extend away from the rear frame or chassis 122 as the tractor-trailer 100 turns and to retract toward the rear frame or chassis 122 as the tractor-trailer 100 returns to a straight-ahead position. This extension and retraction of the compensator portion 152 of the reach 150 is represented by the arrows labeled 156.

In some embodiments, the telescoping reach 150 may be movably coupled to the rear frame of chassis 122, as represented by arrows 158, to allow the entire reach 150 to be relocated and adjusted to accommodate different loads and/or to position the reach 150 in a storage position when the tractor-trailer 100 is operated in the passive steering PS configuration.

With continued reference to FIGS. 1 through 3, the towing tractor 110 may further include a stinger 142 having a coupling end 144 to selectively attach to the coupling end 154 of the telescoping reach 150 of the rear wheel assembly 121. The stinger 142 may be movably coupled to the frame or chassis 114 of the towing tractor 110 to move between a stowed configuration S, as shown in FIG. 1, and a deployed configuration D, as shown in FIGS. 2 and 3. The stinger 142 may also be configured to pitch up and down when the stinger 142 is in the deployed configuration D and attached to the telescoping reach 150 of the rear wheel assembly 121, as represented by the arrows labeled 148 in FIG. 3. For this purpose, the stinger 142 may have a pin connection or other coupling arrangement that enables the stinger to rotate about a transverse axis of rotation $A_3$.

The towing tractor 110 may further include a lock mechanism 160 to selectively lock the stinger 142 in the deployed configuration D. More particularly, the stinger 142 may be selectively lockable to restrain movement of the stinger 142 fore and aft and side-to-side when in the deployed configuration D. For example, in one embodiment, the towing tractor 110 may include a lock mechanism 160 that includes an inflatable member or chamber 160a in fluid communication with a pressurized air system 115 of the towing tractor 110. Pressurized air may be selectively used to inflate the inflatable member or chamber 160a and displace a cam or other locking structure such that it engages a pivot pin or other feature at the base of the stinger 142. The locking mechanism 160 may nest with the pivot pin or other feature of the stinger 142 and may urge it into engagement with a stop. An intermediate flexible member or damper may be positioned between the stinger 142 and the coupling arrangement on the chassis 114 to enable some flexing of the stinger 142 relative to the chassis 114 during operation. Although one specific locking arrangement has been described, it is appreciated that a wide range of locking mechanisms 160 may be used to secure the stinger 142 in the deployed configuration D. Moreover, it is appreciated that, prior to locking the stinger 142, the stinger 142 may be movable to yaw to side-to-side to assist in aligning the coupling end 144 of the stinger 142 with the coupling end 154 of the telescoping reach 150 of the rear wheel assembly 121.

The frame or chassis 114 of the towing tractor 110 may include a rail system 146 or other structure integral therewith or coupled thereto to enable the stinger 142 to move between the stowed configuration S, in which the stinger 142 may be completely or substantially concealed from view, and the deployed configuration D, in which the stinger 142 may be attached to the telescoping reach 150. The base end of the stinger 142 may be slidably coupled to the rail system 146 for moving between the stowed configuration S and the deployed configuration D. While in the stowed configuration S, an additional lock mechanism, catch or other structure (not shown) may secure the stinger 142 in position to prevent it from dislodging or inadvertently deploying when the tractor-trailer 100 is used to haul loads L in the passive steering configuration PS shown in FIG. 1.

Although the example embodiment of FIGS. 1 through 3 is shown as including a rear wheel assembly 121 with a rotatable bolster 128, in other embodiments the tractor-trailer 100 may be provided with a rear chassis 122' that is slidably coupled to a container, bed or platform P of the trailer assembly 120' to move fore and aft in a longitudinal direction aligned with the load, as illustrated in FIG. 4. The rear chassis 122' may move between a locked configuration (e.g., the rear position shown in FIG. 4) in which an orientation of the rear chassis 122' is fixed relative to the container, bed or platform P of the trailer assembly 120' and an unlocked configuration in which the rear chassis 122' is rotatable relative to the container, bed or platform P of the trailer assembly 120' to assist in steering. In this manner, the rear chassis 122' may be displaced linearly to engage a turntable 123 or other rotatable device that is attached to the container, bed or platform P of the trailer assembly 120 to rotate about an axis $A_4$. For this purpose, the rear chassis 122' may include an upper portion 125 that movably engages a linear rail system 131 that extends from a static rear portion 127 of the container, bed or platform P to the turntable 123. The upper portion 125 may be lockable to along the length of the rail system 131 such that the rear chassis 122' can be locked to the static rear portion 127 to limit rotation of the rear chassis 122' relative to the container, bed or platform P, or such that the rear chassis 122' can be locked to the turntable 123 to enable rotation of the rear chassis 122' relative to the container, bed or platform P. The active steering configuration AS may therefore be activated by moving the rear wheel assembly 121' longitudinally (in this case forward) with respect to the load (e.g., container, bed or platform P), as represented by the arrow labeled 159. In such embodiments, it may be particularly advantageous to enable longitudinal adjustment of the telescoping reach 150, as represented by the arrows labeled 158.

Moreover, aspects of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Provisional Application No. 61/785,447 filed Mar. 14, 2013, are incorporated herein by reference in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A tractor-trailer for hauling a load, the tractor trailer comprising:
  a rear wheel assembly having a telescoping reach; and
  a towing tractor including a chassis having a fifth wheel to receive a coupling pin of a trailer assembly carrying the load and having a rail system positioned below the fifth wheel, the towing tractor further including a deployable stinger to selectively attach to the telescoping reach of the rear wheel assembly to provide stinger-steering, the deployable stinger being slidably coupled to the rail system below the fifth wheel to move between a stowed configuration in which at least a majority of the deployable stinger is stowed within the chassis and a deployed configuration in which the deployable stinger extends from a rear end of the chassis to attach to the telescoping reach.

2. The tractor-trailer of claim 1 wherein the deployable stinger of the towing tractor is configured to pitch up and down when the deployable stinger is in the deployed configuration and attached to the telescoping reach of the rear wheel assembly.

3. The tractor-trailer of claim 1 wherein, when the deployable stinger of the towing tractor is in the deployed configuration, the deployable stinger is selectively lockable to restrain movement of the deployable stinger in fore and aft and side-to-side directions.

4. The tractor-trailer of claim 3 wherein the towing tractor includes a lock to selectively lock the deployable stinger in the deployed configuration.

5. The tractor-trailer of claim 4 wherein the towing tractor includes a pressurized air system, and wherein the lock includes an inflatable member in fluid communication with the pressurized air system.

6. The tractor-trailer of claim 1 wherein, when the deployable stinger of the towing tractor is in the deployed configuration and in an unlocked configuration, a coupling end of the deployable stinger is movable side-to-side to assist in aligning the deployable stinger with the telescoping reach of the rear wheel assembly.

7. The tractor-trailer of claim 1 wherein the rear wheel assembly includes a rear chassis and a bolster, the bolster having a locked configuration in which the bolster is fixedly secured to the rear chassis to move in unison therewith and an unlocked configuration in which the bolster is rotatably coupled to the rear chassis.

8. The tractor-trailer of claim 1, further comprising:
the trailer assembly, the trailer assembly including a container, bed or platform and the coupling pin to attach the container, bed or platform to the fifth wheel of the towing tractor.

9. The tractor-trailer of claim 8 wherein the rear wheel assembly includes a rear chassis that is slidable relative to the container, bed or platform of the trailer assembly to move between a locked configuration in which an orientation of the rear chassis is fixed relative to the load and an unlocked configuration in which the rear chassis is rotatable relative to the load to assist in steering.

10. The tractor-trailer of claim 1 wherein the tractor-trailer is convertible between a first steering configuration in which the rear wheel assembly assists in steering and a second steering configuration in which an orientation of the rear wheel assembly is locked relative to the hauled load.

11. The tractor-trailer of claim 1 wherein the telescoping reach is slidably coupled to the rear wheel assembly to selectively adjust a position thereof.

12. The tractor-trailer of claim 1 wherein the rear wheel assembly includes a single axle or multiple axles.

13. A towing tractor to tow a trailer assembly having a coupling pin and a rear wheel assembly with a telescoping reach, the towing tractor comprising:
a chassis, the chassis including a rail s stem;
a fifth wheel mounted to the chassis to selectively attach to the coupling pin of the trailer assembly when using the towing tractor to haul the trailer assembly; and
a deployable stinger slidably coupled to the rail system below the fifth wheel to selectively attach to the telescoping reach of the rear wheel assembly to provide stinger-steering, the deployable stinger movable between a stowed configuration in which at least a majority of the deployable stinger is stowed within the chassis and a deployed configuration in which the deployable stinger extends from a rear end of the chassis to attach to the telescoping reach.

14. The towing tractor of claim 13 wherein the deployable stinger of the towing tractor is configured to pitch up and down when the deployable stinger is in the deployed configuration and attached to the telescoping reach of the rear wheel assembly.

15. The towing tractor of claim 13 wherein, when the deployable stinger is in the deployed configuration, the deployable stinger is selectively lockable to restrain movement of the deployable stinger in fore and aft and side-to-side directions.

16. The towing tractor of claim 15, further comprising:
a lock to selectively lock the deployable stinger in the deployed configuration.

17. The towing tractor of claim 16, further comprising:
a pressurized air system, and wherein the lock includes an inflatable member in fluid communication with the pressurized air system.

18. The towing tractor of claim 13 wherein, when the deployable stinger is in the deployed configuration and in an unlocked configuration, a coupling end of the deployable stinger is movable side-to-side to assist in aligning the deployable stinger with the telescoping reach of the rear wheel assembly.

* * * * *